Dec. 27, 1955
J. F. JOY
2,728,403
MINE TRANSPORT VEHICLE
Filed Aug. 2, 1951
4 Sheets-Sheet 1
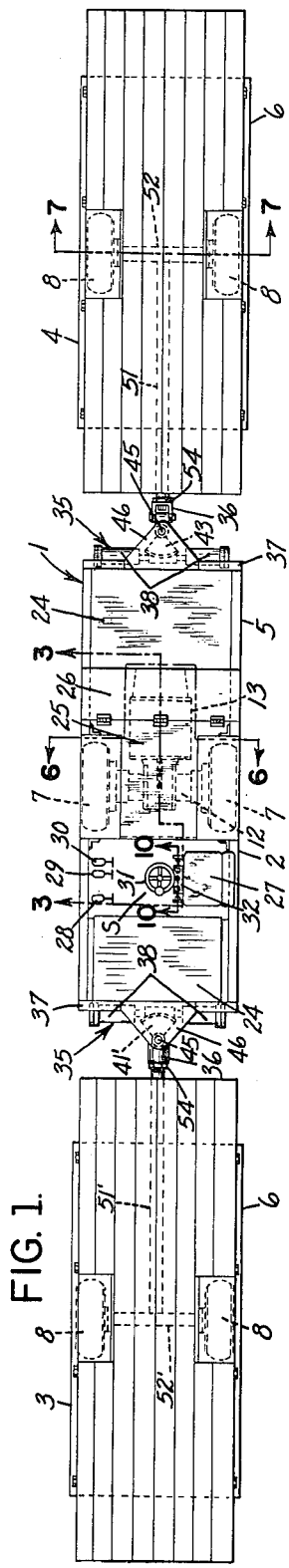
INVENTOR:
JOSEPH F. JOY
BY Charles F. Osgood,
ATTORNEY Dec. 27, 1955  J. F. JOY  2,728,403
MINE TRANSPORT VEHICLE
Filed Aug. 2, 1951  4 Sheets-Sheet 2

INVENTOR:
JOSEPH F. JOY
BY Charles F. Osgood,
ATTORNEY

Dec. 27, 1955
J. F. JOY
2,728,403
MINE TRANSPORT VEHICLE
Filed Aug. 2, 1951
4 Sheets-Sheet 3
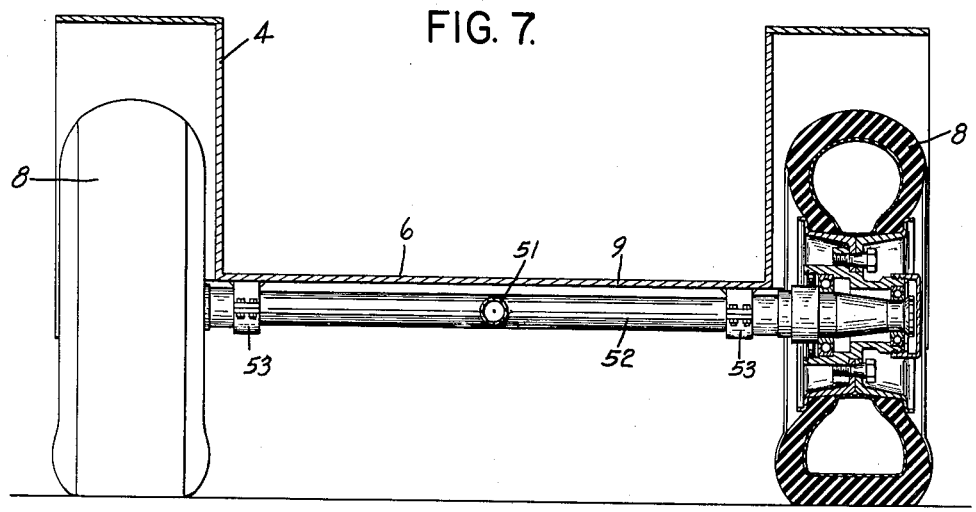
FIG. 7.
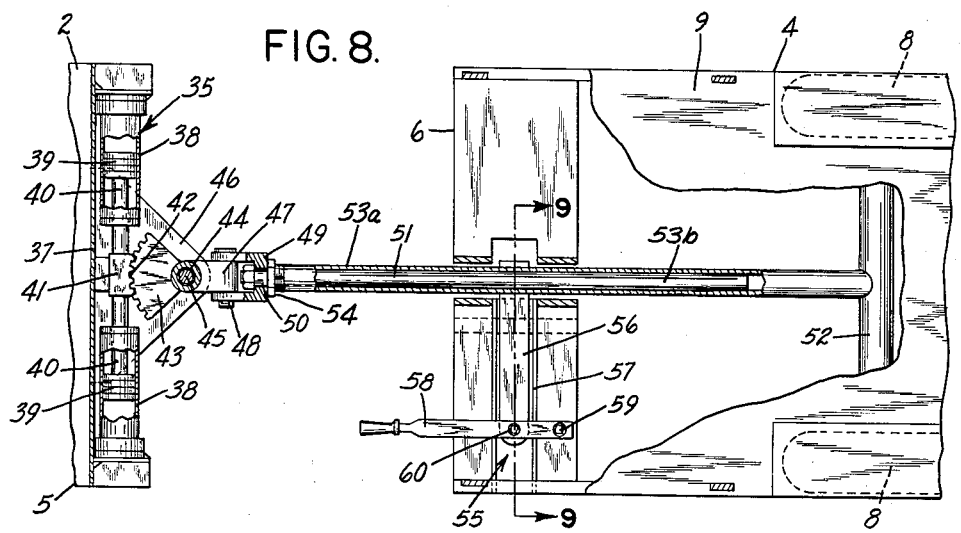
FIG. 8.
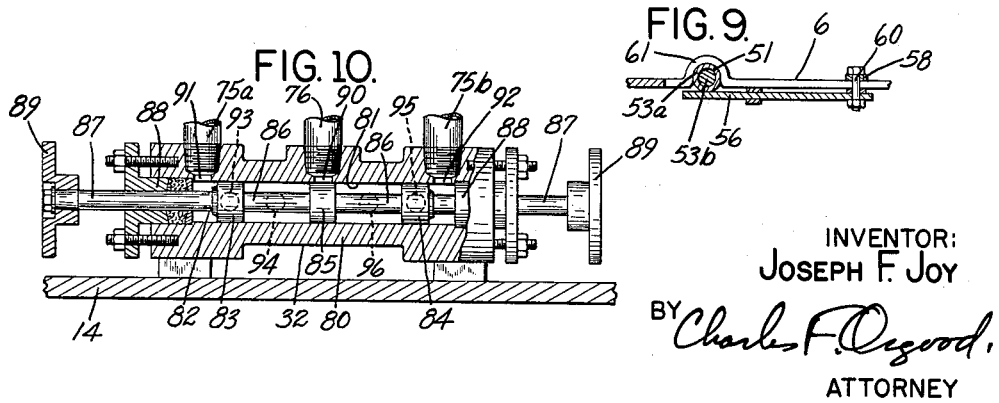
FIG. 9.
FIG. 10.
INVENTOR:
JOSEPH F. JOY
BY Charles F. Osgood,
ATTORNEY Dec. 27, 1955  J. F. JOY  2,728,403
MINE TRANSPORT VEHICLE
Filed Aug. 2, 1951  4 Sheets-Sheet 4
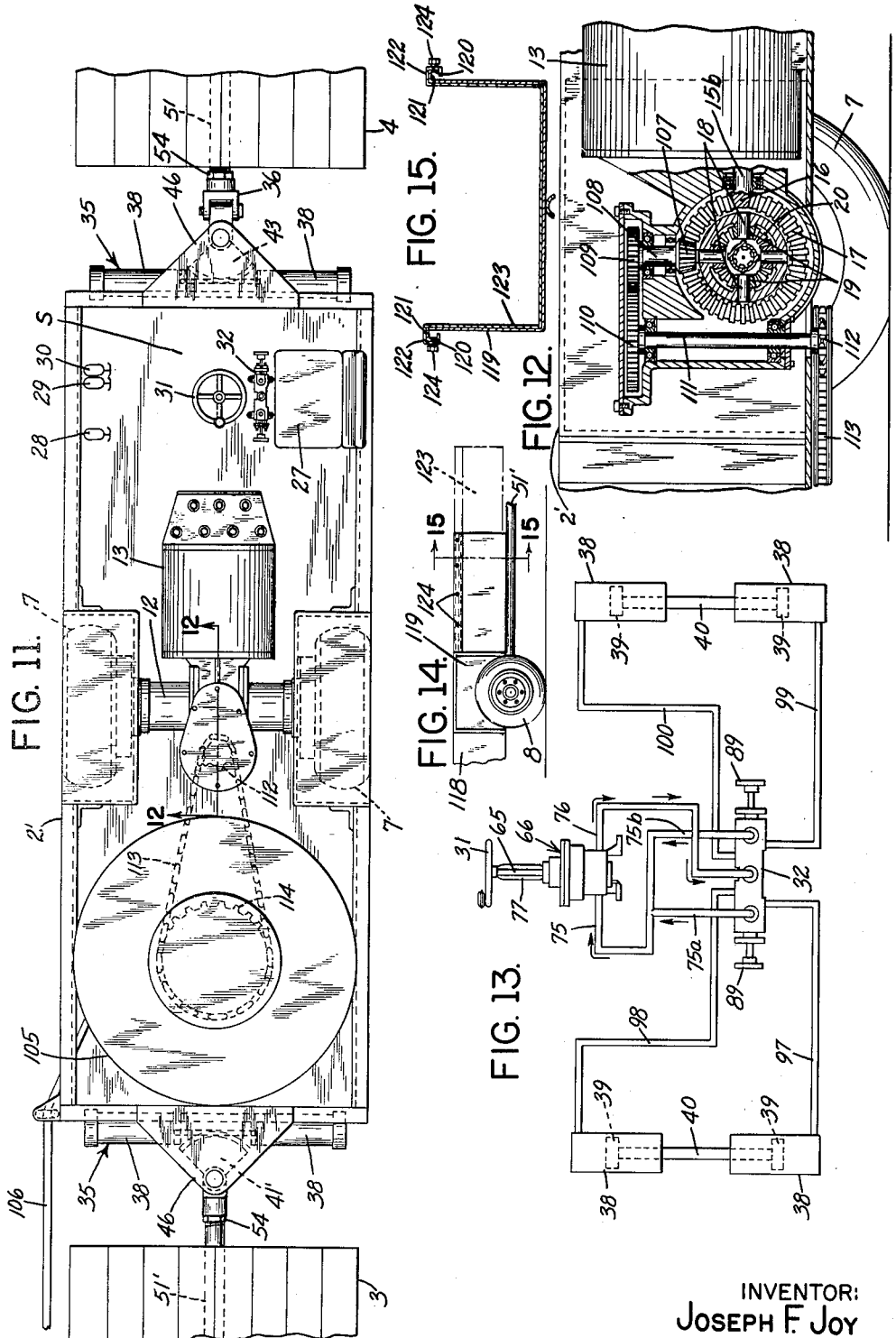
INVENTOR:
JOSEPH F. JOY
BY Charles F. Osgood.
ATTORNEY

United States Patent Office 2,728,403
Patented Dec. 27, 1955

2,728,403
MINE TRANSPORT VEHICLE

Joseph F. Joy, Pittsburgh, Pa., assignor to Joy Manufacturing Co., Pittsburgh, Pa., a corporation of Pennsylvania Application August 2, 1951, Serial No. 239,876

9 Claims. (Cl. 180—11)

This invention relates to transport vehicles and more particularly to a mobile service car especially designed for use in underground mines.

In underground mines, such as coal mines, it is necessary to transport men, supplies and various equipment relatively long distances through the relatively restricted mine passageways. Heretofore, in trackless mines relatively small rubber-tired mobile transport trucks have been employed for this service, and these, due to their relatively small capacity, involve relatively large expense in equipment and labor costs when a relatively large mine is to be serviced. The present invention contemplates improvements over known types of service trucks for mines in that an improved transport vehicle is provided which has relatively large load carrying capacity while retaining the desired characteristics as to compactness and maneuverability whereby the car may readily carry relatively large loads through the restricted mine passageways at a minimum of cost. The service car of the present invention is especially designed for use in trackless mines and is desirably of the plural unit articulated type and may include an intermediate power unit or tractor section and end trailer units with the several units flexibility coupled together in an improved manner, and having improved steering means. The end non-powered units of the improved service car may carry the loads for transport, while the intermediate car may desirably be solely a tractor unit, and the improved steering mechanism is associated with the coupling means between the several articulated units, whereby the forward or leading end unit may be turned relative to the other units to effect steering in a novel manner, while the rear end unit merely serves as a trailer. Evidently, more than three articulated units may be employed if desired, and, under certain conditions, a train of articulated power and trailer units may be provided.

An object of the present invention is to provide an improved transport vehicle. Another object is to provide an improved mine service car for transporting large quantities of supplies and various equipment about the mine, and consisting of several articulated units whereby the car may carry relatively large loads while traveling through the sharply curved and relatively restricted passageways of an underground mine. A further object is to provide an improved transport vehicle of the plurally articulated section or multi-unit type consisting of an intermediate power traction unit or tractor section, and end load-carrying units with the several units flexibly coupled together to permit movement of the vehicle over an undulating floor and through the sharply curved passageways of the mine. Still another object is to provide an improved transport vehicle of the above character having improved steering means arranged at the points of articulation between the several units, whereby the leading unit may always effect steering of the vehicle while the rear unit always acts as a trailer, irrespective of the direction of travel of the vehicle. Yet another object is to provide improved extensible drawbar connections between the several units whereby the distance between the units may be varied, and clamping means are employed normally to secure the extensible drawbar parts against extensible movement. A still further object of the invention is to provide an improved transport vehicle having an improved arrangement and combination of parts. These and other objects and advantages will hereinafter more fully appear.

In the accompanying drawings there are shown for purposes of illustration one form and two modifications which the invention may assume in practice.

In these drawings:

Fig. 1 is a plan view of a mine transport vehicle constructed in accordance with a preferred illustrative embodiment of the invention.

Fig. 2 is a side elevational view of the transport vehicle shown in Fig. 1.

Fig. 3 is an enlarged longitudinal vertical section taken on the planes of line 3—3 of Fig. 1.

Fig. 7 is an enlarged cross section taken on line 7—7 of Fig. 1, illustrating details of a trailer unit axle structure.

Fig. 8 is an enlarged horizontal section taken on line 8—8 of Fig. 2, with parts shown in full.

Fig. 9 is a detail vertical section taken on line 9—9 of Fig. 8.

Fig. 10 is an enlarged vertical section taken on line 10—10 of Fig. 1, showing details of the steering reverse valve device.

Fig. 11 is a fragmentary plan view of a transport vehicle embodying an intermediate tractor unit constructed in accordance with a modified embodiment of the invention.

Fig. 12 is an enlarged vertical section taken on line 12—12 of Fig. 11.

Fig. 13 is a diagrammatic view illustrating the hydraulic fluid system.

Fig. 14 is a fragmentary side view of a modified end car section, showing the extensible car body.

Fig. 15 is an enlarged cross section taken on line 15—15 of Fig. 14.

Figure 4:
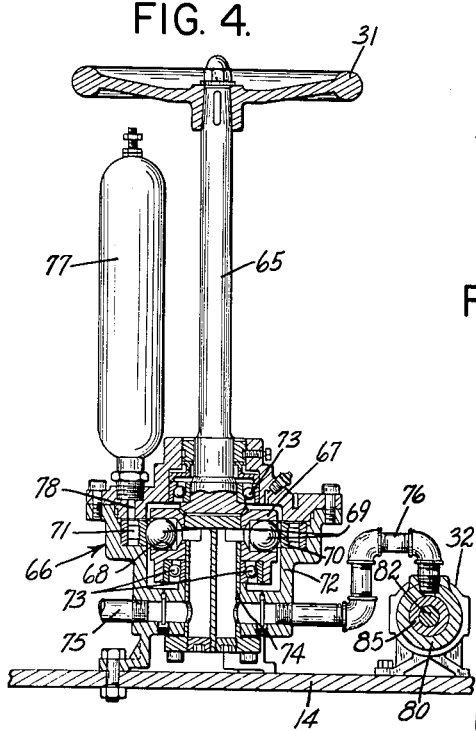
Fig. 4 is an enlarged vertical section taken on line 4—4 of Fig. 3, showing the reversible fluid pump and associated steering wheel.

In this illustrative construction, as shown in the drawings, the improved mobile transport vehicle or so-called mine service car, generally designated 1, is especially designed for use in trackless mines and desirably includes three articulated, low-height sections or units, one an intermediate power unit or tractor section 2, and the others non-powered units or trailer sections 3 and 4. The intermediate power unit 2 has a truck frame 5, while the end units have truck frames 6 providing tiltable load-carrying platforms, and these truck frames are mounted on mobile supporting means herein desirably rubber-tired traction wheels 7 and free rotating supporting wheels 8. The truck frames of the end sections have load-carrying decks 9 adapted to receive a load such as a load of mine timbers and props, as illustrated, or other supplies and equipment. The wheels of each unit are located midway between the ends of the truck frame so that steering of the vehicle is facilitated.

Figure 5:
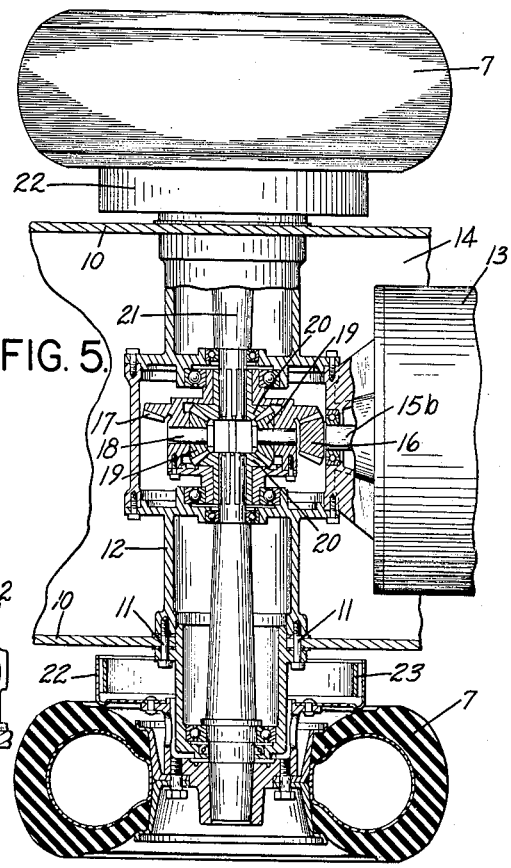
Fig. 5 is an enlarged horizontal section taken on line 5—5 of Fig. 2, showing a portion of the traction wheel drive.
Figure 6:
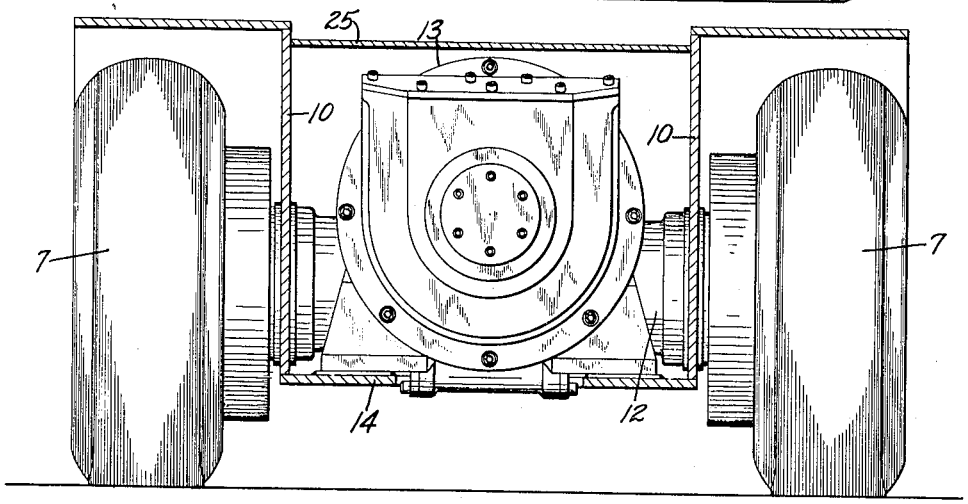
Fig. 6 is an enlarged cross section taken on the planes of line 6—6 of Fig. 1.

The intermediate power unit or tractor section 2 has its truck frame desirably of fabricated welded plate construction, and includes parallel longitudinally extending vertical side plates 10 (see Figs. 5 and 6) secured, as by screws 11, to and mounted on a centrally located axle housing 12, and a reversible driving motor 13 is mounted on a bottom plate 14 of the truck frame (Fig. 6). This motor is desirably an electric motor and has its power shaft 15 horizontally disposed and extending longitudinally of the truck frame midway between the sides of the latter, and keyed to this motor shaft is a spur pinion 15a (Fig. 3) meshing with a spur gear keyed to a longitudinal shaft 15b. Integral with this shaft is a bevel pinion 16 meshing with a bevel gear 17 (Fig. 5) of a differential gearing of the conventional automatic type. Journaled on radially located shafts 18 on the differential housing and enclosed within the latter are bevel planet gears 19 meshing with coaxial bevel gears 20, 20 respectively keyed to the inner adjacent ends of aligned axles 21 to which the hubs of the traction wheels 7 are secured. The traction wheels are provided with conventional automotive brake drums 22 having expansible brake bands 23 cooperating therewith for braking wheel rotation.

The intermediate tractor unit 2 is, in this instance, of the battery powered type, and conventional storage batteries 24, 24 are arranged transversely of the truck frame 5 at its opposite ends, as shown in Figs. 1 and 2. The motor and axle housing of this unit are enclosed by a suitable casing 25 having a pivoted top cover plate 26 to provide for ready access to the motor and other parts. Arranged on the truck frame is an operator's station S and an operator's seat 27, a brake pedal 28, forward and reverse pedals 29 and 30, a steering wheel 31 and a steering reverse valve device 32, are conveniently located at the operator's station.

Mounted at the opposite ends of the truck of the intermediate tractor unit 2 are steering devices, generally designated 35, which are associated with coupling mechanisms 36 located between the several car units. As shown in Fig. 8, each of the steering devices 35 comprises a transverse frame 37 secured to the adjacent end of the truck frame; and aligned fluid cylinders 38, 38 are arranged transversely of the truck at opposite sides thereof. Contained in these cylinders are reciprocable pistons 39 connected for movement in unison by a piston rod structure 40. Piston rod sections are secured to an intermediate rack member 41 suitably guided for transverse movement along the frame 37 and having rack teeth 42 which are meshed with the teeth of a gear segment 43, the latter being pivoted at 44 on the frame 37 to swing in horizontal planes with respect thereto. This rack member is pivoted on a vertical pivot pin 45 secured to vertically spaced horizontal projections 46 of the frame 37, as shown in Fig. 2. This rack member has an outward projection 47 pivotally connected by a transverse pivot pin 48 on a horizontal axis at right angles to the rack segment pivot axis thereby to provide a flexible universal joint connection between the gear segment and a coupling member 49. This coupling member is swivelly connected at 50 to a longitudinal drawbar member 51 to turn about the longitudinal axis of the drawbar, and this drawbar member is rigidly connected to a transverse axle 52 for the free-rotating wheels 8 of the associated end unit 4.

The steering device 35 at the opposite end of the intermediate tractor unit is similar to that above described but, in this instance, the pivoted gear segment 41' may be rigidly connected to a longitudinal drawbar member 51' secured to the transverse axle 52' for the other end unit 3. The axles of the end units are suitably journaled in bearing brackets 53 connected to the bottoms of the truck frames of the end units, as shown in Fig. 7, in such manner that relative tilting movement between the drawbars and the truck frames about the wheel axes is made possible. If desired, there may be a swivelled connection between the gear segment projection and the drawbar 51' of the end unit 3, similar to the swivel connection at 50, so that there may be relative swivelling movement between the parts about the longitudinal axis of the drawbar to increase the flexibility of movement of the vehicle.

The drawbars 51 and 51' are desirably extensible whereby the distance between the cars may be varied, and each includes telescopic elements 53a and 53b which are adapted to be secured against extensible movement by a conventional clamp 54.

To permit tilting movement of the truck frames of the end units, as indicated in dotted lines in Fig. 2, to facilitate unloading or dumping of the loads on the platforms of the end units, latch devices, generally designated 55, are provided which each comprises, as shown in Figs. 8 and 9, a shiftable latch bar 56 guided for endwise movement in a transverse guideway 57 formed on the truck frame. A lever 58 is pivoted at 59 on the truck frame and is pivotally connected at 60 to the latch bar whereby the latter may be manually shifted back and forth in its guideway. The truck frame has curved upwardly bent portions 61 adapted to fit against and to rest on the drawbar 51 when the truck frame is in horizontal transport position, and the latch bar is adapted to underlie the drawbar rigidly to lock the truck frame against tilting movement. It will thus be seen that when the latch bar is retracted from beneath the drawbar, the truck frame is free to tilt about the wheel axes.

Now, referring to the steering means for the vehicle, it will be noted that the steering wheel 31 is fixed to the upper end of a vertical steering post 65, and this post is connected at its lower end to an element of a reversible hand pump, generally designated 66. This pump may be similar in design to that disclosed in my copending application, Serial No. 723,436, filed January 21, 1947, now matured into Patent No. 2,646,755, granted July 28, 1953, and comprises a rotary cylinder member 67 to which the steering post is integrally connected, as shown in Fig. 4, whereby the steering wheel may rotate the pump cylinder in one direction or the other. This cylinder member has radial cylinder bores 68 containing spherical pistons 69 which react against the inner race 70 of a roller bearing 71 suitably supported eccentrically within the outer pump casing 72, the latter being secured to the bottom plate of the truck frame. This rotary cylinder member is mounted in bearings 73 respectively supported within the pump casing and by a vertical stationary spindle 74 rigidly secured within the lower portion of the pump casing. This stationary spindle extends upwardly into an axial bore in the cylinder member 67 and has formed therein suitable inlet and discharge ducts, and intake and discharge pipes 75 and 76 communicating with these passages. A conventional accumulator 77 has connection at 78 with the interior of the pump casing. Thus, when the steering wheel 31 is turned in the proper direction, the pump is actuated to supply liquid under pressure through one of the pipes 75, 76 to one of the cylinders 38 of the steering devices for effecting movement of the pistons 39 to effect steering. Evidently, when the pump cylinder is turned in one direction by the steering wheel, one of the pipes 75, 76 acts as a discharge pipe while the other acts as a return pipe, and liquid under pressure may be supplied to either of these pipes depending upon the direction of rotation of the pump.

The flow of liquid under pressure to the proper ones of the steering cylinders 38 of the steering devices 35 may be controlled by the steering reverse valve device 32. This reverse valve device comprises a casing 80 mounted on the truck frame and having a horizontal bore 81 containing a conventional reciprocable spool-type slide valve 82. This valve has end spools 83 and 84 and a centrally located spool 85, and these spools are connected by reduced portions 86 to provide annular spaces between the spools. The valve has oppositely extending stems 87 projecting outwardly through glands 88 to the opposite ends of the valve casing, and these stems carry operating elements 89 adapted for either hand or foot operation. The pipe 76 is connected to a passage 90 communicating with the bore 81 midway between its ends, while the pipe 75 has branches 75a and 75b which are respectively connected to passages 91 and 92 communicating with the opposite ends of the valve-receiving-bore. Communicating with the valve-receiving-bore at longitudinally spaced points between the end passages 91 and 92 and the central passage 90 are passages 93, 94 and 95, 96, and the passages 93 and 94 are connected by conduits 97 and 98 respectively, to the remote ends of the cylinders 38 of one of the steering devices 35, while the passages 95 and 96 are respectively connected by conduits 99 and 100 to the opposite ends of the cylinders 38 of the other steering device 35, as shown diagrammatically in Fig. 13. Thus, depending upon the position of the slide valve 82, liquid under pressure may be selectively supplied to the cylinders 38 of either of the steering devices. One steering device is, however, inactive while the other is active, so that the leading unit of the vehicle may be turned to effect steering while the rear unit trails behind the tractor unit, irrespective of the direction of travel of the vehicle. For example, when the slide valve is shifted to the left in Fig. 10, liquid under pressure may flow through pipe 76, passage 90, passage 96 and pipe 100 to one of the steering cylinders 38, while the other steering cylinder is connected to exhaust through conduit 99, passage 95, passage 92, branch conduit 75b, and return conduit 75, back to the pump. When the pump is reversed by turning the hand wheel 31 in the opposite direction, liquid under pressure may flow through pipe 75, branch pipe 75b, passage 92, passage 95 and conduit 99 to the other steering cylinder 38, to effect steering during travel in the opposite direction. When the slide valve is shifted into its right-hand position, liquid under pressure may be supplied through one or the other of the conduits 97, 98 to the steering cylinders 38 of the other steering device, depending upon the direction of pump rotation, in a substantially similar manner. When one of the steering devices is active, the other inactive steering device has its pistons 39 freely movable in its cylinders due to the by-passing of fluid through the conduits and the annular space between the spools of the valve, thereby to enable the trailing end unit to trail freely behind the tractor unit.

In the modification shown in Figs. 11 and 12, the intermediate tractor unit 2' is of the cable reel type instead of the battery type of the embodiment above described. In this improved construction, the batteries are omitted and an electric cable reel 105 is mounted on the truck frame to revolve about an upright axis. Wound on this cable reel is a power conductor cable 106 which is adapted to extend to any suitable source of electric power, and associated with this reel are usual electrical connections with the electric motor 13. The cable reel may be driven in any suitable manner so that as the vehicle travels away from the power source the conductor cable is unwound from the reel, and as the vehicle travels in the reverse direction the conductor cable is automatically wound in. The reel drive disclosed herein for illustrative purposes comprises a bevel gear 107 meshing with the bevel gear 17 of the traction wheel drive, and the gear 107 is secured to the lower end of a vertical shaft 108 suitably journaled within the axle housing. Fixed to the upper end of the shaft is a spur gear 109 meshing with and driving a spur gear 110 fixed to the upper end of a parallel shaft 111, likewise suitably journaled within the axle housing. Fixed to the lower end of the shaft 111 is a chain sprocket 112 connected by an endless drive chain 113 to a chain sprocket 114 connected to the reel. Any suitable frictional slip device may be incorporated in the reel drive to permit slippage under certain conditions, if desired. Thus, the cable reel may be driven in one direction or the other, depending on the direction of vehicle movement. Otherwise, this modification of the invention is similar to the embodiment above described.

Evidently, under certain conditions, one end unit of the vehicle may be omitted and, when so, either the tractor unit or the end unit may be turned to effect steering of the vehicle. It is desirable, however, under most conditions, that the traction unit have no steering function. Also, if desired, more than one traction unit and two end trailer units may be employed, and under certain conditions a number of units may be used to provide a train.

In Figs. 14 and 15 a modified form of car body is shown. In this construction the car body is designated 118 and is of a boxlike plate construction, and the intermediate rigid portion 119 of the body has top flanges 120 which provide guides 121 received in longitudinal guideways 122 of telescopic end body sections 123. Screws 124 are provided for securing the telescopic end body sections in adjusted positions. In Fig. 14 the end body section is shown collapsed in full lines and the extended position of the body section is indicated in dotted lines. From the foregoing it is evident that both the body and the drawbar connections of the end car units may be extended or retracted as desired, and firmly secured in adjusted positions. By the provision of the extensible body for each end unit, the load carrying capacity of the vehicle may be modified as desired. If desired the central tractor unit may be provided with similar extensible body portions.

The general mode of operation of the improved mine transport vehicle is as follows: In Figs. 1 and 2, the end units 3 and 4 of the vehicle are shown in a loaded condition, and the loaded vehicle may be propelled in either direction about the mine by the intermediate tractor unit 2, depending upon the direction of operation of the driving motor 13. The flexible couplings 36 between the several car units permit the vehicle readily to traverse an undulating floor surface and to move through the sharply curved mine passages. When the vehicle is traveling toward the right as viewed in Figs. 1 and 2, the operator at his station S on the traction unit may turn the steering wheel 31 in one direction or the other to supply liquid under pressure from the pump 66 to one or the other of the cylinders 38 of the forward steering device 35, thereby to turn the leading unit 4 either to the right or left to effect steering of the vehicle. The pistons 39 of the rear steering device 35 are at this time inactive, and may freely move back and forth in their cylinders due to the provision for the by-passing of liquid through the conduits and passages and past the slide valve 82. When reverse travel of the vehicle is desired, the slide valve 82 is shifted to its opposite position, and the left-hand steering device 35 as viewed in Figs. 1 and 2, is rendered active while the right-hand steering device is rendered inactive, thus enabling turning of the then-leading unit 3 either to the right or left to effect steering of the vehicle. When unloading of platforms of the end units is desired, the operator may manipulate the levers 58 of the latch devices to permit tilting of the truck frame 6 of the end units about their wheel axes into the positions shown in dotted lines in Fig. 2. When the end units are unloaded, they may again be tilted back into their horizontal transport positions and rigidly locked therein by the latch bars 56.

As a result of this invention, an improved mobile transport vehicle is provided which may carry relatively large loads such as men, supplies or other equipment through the restricted passageways of an underground mine. By the provision of a vehicle consisting of a plurality of articulated sections or units, together with the improved steering means associated with the couplings between the units, the leading end unit may be turned either to the right or left as desired to effect steering of the vehicle in an extremely simple and effective manner. The improved arrangement disclosed, embodying the intermediate traction unit and the end non-powered units, with the several units flexibly coupled together, enables the vehicle readily to travel through the sharply curved passageways and over a mine floor which is uneven. The novel fluid pump arrangement operated by the steering wheel provides an extremely simple and compact means for supplying operating fluid to the steering cylinders to effect steering of the vehicle, and by the provision of the reversing valve the direction of steering may be reversed at will. The vehicle is not only capable of transporting a comparatively large load and is flexible and readily steered, but is also well balanced, low in height, and simple and rugged in design, well adapted for its intended purpose. Other advantages of the invention will be clearly apparent to those skilled in the art.

While there are in this application specifically described one form and two modifications which the invention may assume in practice, it will be understood that this form and modification of the same are shown for purposes of illustration, and that the invention may be further modified and embodied in various other forms without departing from its spirit or the scope of the appended claims.

What I claim as new and desire to secure by Letters Patent is:

1. In a reversible transport vehicle adapted to travel in either of opposite directions comprising three articulated units arranged in end to end relation and each having a body, said units having mobile supporting means adapted to travel over a floor surface, the intermediate one of said units being a power tractor unit and the others being end trailer and pusher units which alternatively trail freely behind and are pushed in advance of said tractor unit depending upon the direction of travel of the vehicle, said end units each having floor engaging supporting means only midway between its ends, flexible coupling means between said units, said coupling means cooperating with the bodies of said units to effect mutual support of said bodies one by another, and steering means operatively associated with said coupling means and alternatively effective positively to turn the unit which is the then leading unit bodily horizontally to the right or left relative to said traction unit during opposite directions of travel of the vehicle to effect steering of the latter, the steering means for the unit which is the then trailing unit being rendered inactive irrespective of the direction of travel of the vehicle, and control means for said steering means for alternatively rendering the one active while the other steering means is concurrently rendered inactive.

2. A reversible transport vehicle as set forth in claim 1 wherein said steering means comprises fluid operated cylinder and piston means arranged at and secured to the opposite ends of said tractor unit and includes fluid actuated means operatively connected to said end units and said control means includes control valve means for alternatively supplying pressure fluid to the cylinder and piston means of said forward steering means to effect steering while said rearward steering means is concurrently rendered inactive.

3. A reversible mobile transport vehicle comprising a load carrying unit having supporting wheels adapted to travel over the ground, and steering means at the opposite ends of the vehicle for effecting steering of the vehicle including reversible fluid operated steering cylinder and piston motor devices one at each end of said vehicle, an operator controllable manual steering wheel, a motor fluid pump operated by said manual steering wheel for supplying fluid under pressure to said steering cylinder devices to operate the latter, and an operator controllable reversing valve device for controling flow of fluid from said pump selectively to said cylinder and piston devices and shiftable at will to effect alternative operation of said steering devices.

4. A reversible mobile transport vehicle as set forth in claim 3 wherein said devices at the opposite ends of the vehicle each includes oppositely operable steering cylinders to which fluid is supplied to effect steering of the vehicle to the right or left, and said pump is reversible for alternately supplying fluid under pressure to said cylinders depending upon the direction of rotation of said manual steering wheel, and said valve device has a reversing valve shiftable at will to control the flow of fluid alternatively to said cylinders of said devices respectively.

5. A reversible transport vehicle comprising an intermediate traction unit and end units, said units pivotally connected together in end to end relation and having supporting wheels adapted to travel over the ground, each of said units having but a single pair of supporting wheels located midway between its ends, said intermediate unit being a tractor unit and having driving means for its pair of supporting wheels, coupling means for pivotally connecting said units together to effect mutual support between said coupled units one by another on said wheels, and operator controllable steering means at the opposite ends of said intermediate tractor unit and operatively connected to said end units positively to turn the then leading end unit bodily as a unit horizontally to the right or left relative to said intermediate unit to effect steering of the vehicle irrespective of the direction of vehicle movement, said steering means each comprising fluid actuated cylinder and piston means, an operator controllable hand steering wheel, a fluid pump operated by said steering wheel for supplying fluid pressure to said cylinder and piston means, and a reversing valve device for selectively rendering effective said cylinder and piston means of said steering means at the opposite ends of said tractor unit.

6. A transport vehicle as set forth in claim 5 wherein said fluid pump is reversible for selectively supplying fluid to said steering means to effect steering either to the right or left depending upon the direction of rotation of said hand steering wheel and said reversing valve device controls fluid flow to said cylinder and piston means irrespective of the direction of operation of said pump.

7. A mobile transport vehicle comprising a wheeled tractor unit and a front wheeled load carrying unit flexibly coupled to said tractor unit so as to be pushed by the latter, each unit having but a single pair of supporting wheels located midway between its ends and said units mutually cooperating to prevent undesired tilting thereof about their respective wheel axes, said tractor unit being steered by said front unit, said front unit having an axle carrying its supporting wheels and provided with a normally longitudinally rigid draw bar, and an operator controllable steering device carried by said tractor unit and operatively connected to said draw bar for swinging the latter together with the axle and wheels of said front unit thereby for positively bodily turning said front unit about its coupling horizontally with its wheels either to the right or left relative to said tractor unit to effect steering of the vehicle, said steering device comprising aligned fluid motor cylinders arranged transversely of and secured to said tractor unit, pistons reciprocable in said cylinders respectively, a piston rod structure connecting said pistons for movement in unison, and a mechanical transmission connection between said piston rod structure and said draw bar, movement of said pistons in said cylinders effecting swinging of said draw bar to turn said front unit as aforesaid.

8. A mobile transport vehicle as set forth in claim 7 wherein said mechanical transmission connection includes a rack secured to said piston rod structure, a pivoted gear segment having teeth meshing with the rack teeth, and said draw bar connected to said gear segment and to said front unit.

9. A reversible transport vehicle of an elongated, low height, articulated construction including a plurality of mobile units flexibly coupled in end to end relation and said units including end load-carrying units and an intermediate unit, supporting wheels for said intermediate and end units adapted to travel over a floor surface, said intermediate and end units each being supported centrally between its ends solely by but a single pair of said wheels, flexible coupling means between said units and connected to the latter so that said units mutually cooperate to prevent undesired tilting of any unit about the axes of its centrally located pair of wheels, and operator controllable steering means arranged at the opposite ends of said intermediate unit and operatively connected to said end units for positively bodily turning the then leading end unit with its wheels horizontally to the right or left relative to said intermediate unit to effect steering of the vehicle irrespective of the direction of travel of the vehicle, said steering means including control means on said intermediate unit for rendering the forward steering means active to effect steering while concurrently rendering said rearward steering means inactive to permit the then rear unit always to trail freely on its pair of wheels behind said intermedaite unit.

References Cited in the file of this patent

UNITED STATES PATENTS

| Number | Name | Date |
|---|---|---|
| 657,260 | Wilcke | Sept. 4, 1900 |
| 739,675 | Houghton | Sept. 22, 1903 |
| 1,162,988 | Dittman | Dec. 7, 1915 |
| 1,375,678 | Crum | Apr. 26, 1921 |
| 1,816,393 | Morris | July 28, 1931 |
| 1,877,126 | Greer | Sept. 13, 1932 |
| 1,895,992 | Hepburn | Jan. 31, 1933 |
| 1,953,052 | Linn | Mar. 27, 1934 |
| 2,053,272 | Eaton | Sept. 8, 1936 |
| 2,167,943 | Fox | Aug. 1, 1939 |
| 2,174,063 | Richards | Sept. 26, 1939 |
| 2,178,073 | Tardy | Oct. 31, 1939 |
| 2,358,236 | Lee | Sept. 12, 1944 |
| 2,362,262 | French | Nov. 7, 1944 |

FOREIGN PATENTS

| Number | Country | Date |
|---|---|---|
| 328,931 | Great Britain | May 6, 1930 |